US012336027B2

(12) United States Patent
Guduru et al.

(10) Patent No.: US 12,336,027 B2
(45) Date of Patent: Jun. 17, 2025

(54) SYSTEMS AND METHODS FOR USER EQUIPMENT RELIABILITY AND AVAILABILITY IN A WIRELESS NETWORK

(71) Applicant: Verizon Patent and Licensing Inc., Basking Ridge, NJ (US)

(72) Inventors: Vijayakrishna P. Guduru, Denville, NJ (US); Sudhakar Reddy Patil, Flower Mound, TX (US); Raquel Morera Sempere, Weehawken, NJ (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 447 days.

(21) Appl. No.: 18/046,168

(22) Filed: Oct. 13, 2022

(65) Prior Publication Data

US 2024/0129967 A1    Apr. 18, 2024

(51) Int. Cl.
*H04W 4/00* (2018.01)
*H04W 8/00* (2009.01)
*H04W 76/14* (2018.01)
*H04W 88/04* (2009.01)

(52) U.S. Cl.
CPC ........... *H04W 76/14* (2018.02); *H04W 8/005* (2013.01); *H04W 88/04* (2013.01)

(58) Field of Classification Search
CPC ..... H04W 76/14; H04W 8/005; H04W 88/04; H04W 8/00
USPC ........................................................ 370/329
See application file for complete search history.

(56) References Cited

U.S. PATENT DOCUMENTS

| 9,622,089 | B1* | 4/2017 | Ngo | H04K 3/822 |
|---|---|---|---|---|
| 12,028,146 | B2* | 7/2024 | Ryu | H04W 74/0808 |
| 2013/0315079 | A1* | 11/2013 | Edge | H04W 76/14 |
| | | | | 370/252 |
| 2016/0226669 | A1* | 8/2016 | Livanos | H04L 41/0893 |
| 2016/0227044 | A1* | 8/2016 | Livanos | H04L 41/0893 |
| 2017/0156149 | A1* | 6/2017 | Lin | H04K 3/226 |
| 2023/0247654 | A1* | 8/2023 | Zhang | H04L 5/0092 |
| | | | | 370/329 |

(Continued)

OTHER PUBLICATIONS

Third Generation Partnership Project, "Technical Specification Group Services and System Aspects; System Architecture for the 5G System (5GS); Stage 2 (Release 17)," TS 23.501 V17.6.0 (Sep. 2022).

(Continued)

*Primary Examiner* — Marceau Milord

(57) ABSTRACT

A first User Equipment ("UE") may communicate with a second UE via a communication link to determine an operational status of the second UE. The second UE may be connected to a network via one or more communication sessions. The first UE may determine, based on the communication link, that the second UE is non-operational, and may output, based on determining that the second UE is non-operational, a request to communicate with the network via the one or more communication sessions associated with the second UE. The network may modify the one or more communication sessions to be associated with the first UE based on the request, and the first UE may communicate with the network via the one or more modified communication sessions.

20 Claims, 10 Drawing Sheets

(56) References Cited

U.S. PATENT DOCUMENTS

| | | | |
|---|---|---|---|
| 2023/0262479 A1* | 8/2023 | Xue | H04B 7/0695 |
| | | | 370/329 |
| 2023/0308855 A1* | 9/2023 | Matolia | H04W 4/50 |
| 2024/0064775 A1* | 2/2024 | Babaei | H04L 5/0094 |
| 2024/0236598 A1* | 7/2024 | Peng | H04S 7/301 |
| 2024/0276595 A1* | 8/2024 | Blasco Serrano | H04W 76/14 |
| 2025/0048398 A1* | 2/2025 | Hong | H04W 72/25 |

OTHER PUBLICATIONS

Third Generation Partnership Project, "Technical Specification Group Services and System Aspects; Procedures for the 5G System (5GS); Stage 2 (Release 17)," TS 23.502 V17.6.0 (Sep. 2022).

Third Generation Partnership Project, "Technical Specification Group Services and System Aspects; Policy and Charging Control Framework for the 5G System (5GS); Stage 2 (Release 17)," 3GPP TS 23.503 V17.6.0 (Sep. 2022).

Third Generation Partnership Project, "Technical Specification Group Radio Access Network; NR; User Equipment (UE) Radio Transmission and Reception; Part 1: Range 1 Standalone (Release 17)," 3GPP TS 38.101-1 V17.7.0 (Sep. 2022).

Third Generation Partnership Project, "Technical Specification Group Radio Access Network; NR; Radio Resource Control (RRC) Protocol Specification (Release 17)," 3GPP TS 38.331 V17.2.0 (Sep. 2022).

Third Generation Partnership Project, "Technical Specification Group Radio Access Network; NG-RAN; NG Data Transport (Release 17)," 3GPP TS 38.414 V17.0.0 (Apr. 2022).

* cited by examiner

SYSTEMS AND METHODS FOR USER EQUIPMENT RELIABILITY AND AVAILABILITY IN A WIRELESS NETWORK

BACKGROUND

Wireless user equipment ("UE"), such as mobile telephones, Internet of Things ("IoT") devices, industrial sensors, automated guided vehicles ("AGVs"), automated mobile robots ("AMRs"), fixed wireless access ("FWA") devices, or other wireless communication devices, may communicate via a wireless network. Situations may arise in which a UE may become unavailable, unreachable, etc. via the wireless network, such as a hardware failure at the UE, a connection interruption between the UE and the wireless network, or other types of situations. During such time, application servers or other devices may not be able to communicate with the UE, which may include sending traffic to or receiving traffic from the UE. Thus, systems or services that rely on communications between the UE and the other device(s) may become disrupted.

DETAILED DESCRIPTION OF EXAMPLE EMBODIMENTS

Figure 1:
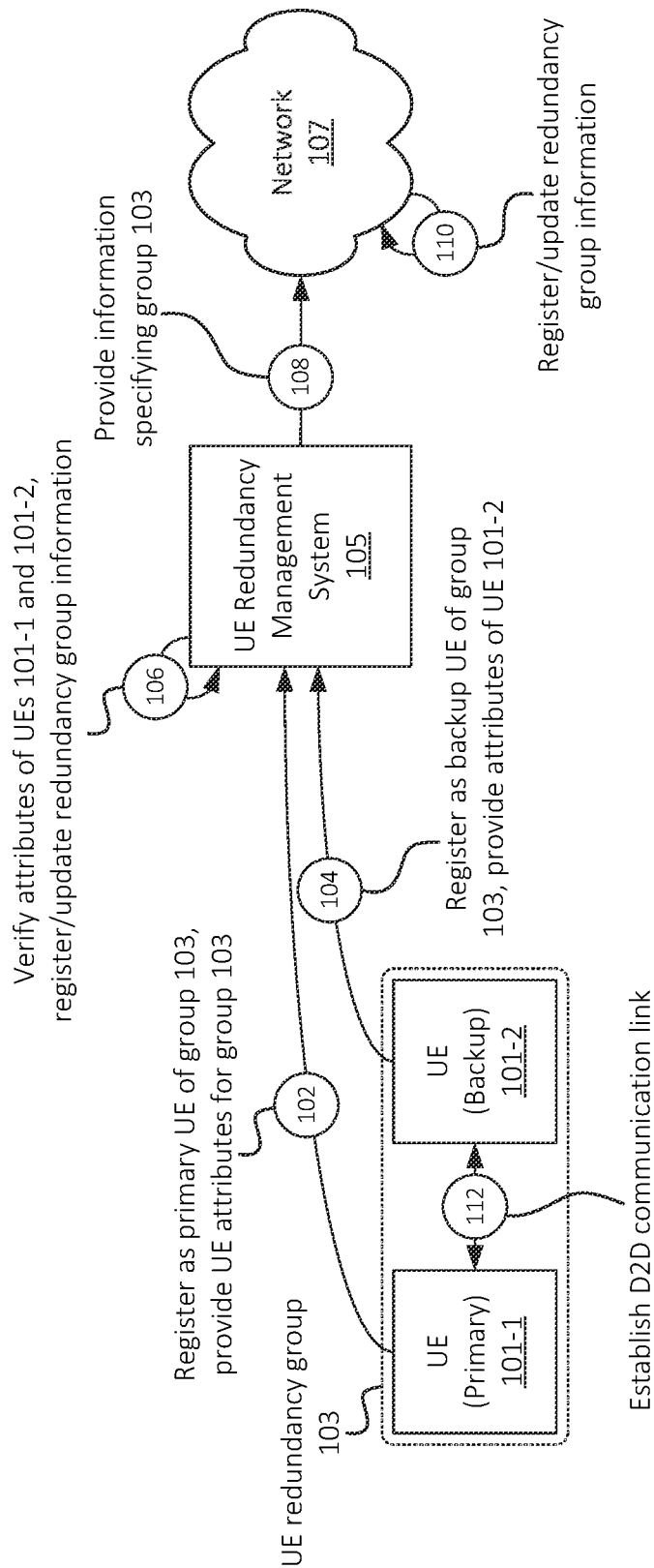
FIG. 1 illustrates an example registration of a UE redundancy group with a network, in accordance with some embodiments.

The following detailed description refers to the accompanying drawings. The same reference numbers in different drawings may identify the same or similar elements.

Some systems or services may include or utilize communications between a UE and another device (e.g., an application server, another UE, a Multi-Access/Mobile Edge Computing ("MEC") device, referred to sometimes herein simply as a "MEC," etc.) via a wireless network. For example, a particular UE may include an IoT device, one or more sensors, a Machine-to-Machine ("M2M") device, etc. that communicate with a remote device in order to facilitate or implement one or more services, such as an autonomous or semi-autonomous vehicle control service, a manufacturing robot control service, a smart home service, etc.

For example, a particular UE may include or may be communicatively coupled to a set of sensors (e.g., one or more accelerometers, barometers, thermometers, gyroscopes, motion detection sensors, photosensors, Light Detection and Ranging ("LIDAR") sensors, etc.), and may report sensor readings to an application server on an ongoing basis (e.g., periodically, intermittently, based on the occurrence of one or more events or triggers, etc.). The application server may process the sensor readings from the UE and/or one or more other information sources, which may include one or more other UEs. For example, based on processing the sensor readings, the application server may generate one or more responses, feedback, etc. based on receiving and/or processing the sensor readings. For example, the application server may generate instructions for controlling a manufacturing robot, an autonomous vehicle, and/or one or more other devices or systems or components thereof, and may send such instructions to the UE and/or some other suitable device or system. In some situations, the availability of the UE may be extremely important, "mission critical," etc. such that high amounts of reliability and availability may be needed in order to ensure that particular services are delivered in accordance with one or more Service Level Agreement ("SLAs"), Quality of Service ("QoS") thresholds, and/or are otherwise delivered in a satisfactory manner.

Embodiments described herein provide for enhanced levels of reliability and availability of a UE in a wireless network, in which a group of UEs may include a primary UE and one or more backup UEs. As discussed below, in situations where the primary UE becomes unavailable, unreachable, etc., a particular backup UE may automatically detect the failure of the primary UE and may resume operations that were previously performed by the primary UE (e.g., collecting sensor data and providing the sensor data to a particular application server or other suitable device or system) in a seamless manner. For example, in some embodiments, the primary UE and the one or more backup UEs may communicate via a device-to-device ("D2D") connection, a direct connection, a Sidelink connection, or some other suitable communication pathway, via which the secondary UE may detect the failure or unreachability of the primary UE. Further, in some embodiments, the wireless network may detect the unreachability of the primary UE, and may facilitate an expedited connection, registration, session establishment, etc. associated with the secondary UE based on detecting the unreachability of the primary UE, thus further enhancing the speed of a failover from the primary UE to the secondary UE and reducing the likelihood of any service disruption based on such failover procedure.

As shown in FIG. 1, two UEs 101 (i.e., UEs 101-1 and 101-2, in this example) may be associated with each other as a particular redundancy group 103. UEs 101-1 and 101-2 may, for instance, be physically co-located, may be the same type (e.g., same make, model, category, etc.) of device, may include the same capabilities or set of devices or components (e.g., may include the same types of sensors, antennas, radios, etc.), may be owned or operated by the same user or entity, and/or may otherwise be appropriate for reliability and availability techniques described herein. In some embodiments, UEs 101-1 and 101-2 may be separate devices that are communicatively coupled to the same device or set of devices. For example, UEs 101-1 and 101-2 may both be communicatively coupled to the same sensor, set of sensors, sensor array, etc., and may each receive the sensor readings received from such sensor, set of sensors, etc. As another example, UEs 101-1 and 101-2 may each include the same set of sensors (e.g., one respective set of sensors for each UE 101) and may each collect sensor readings via their own respective sets of sensors.

As shown, UE 101-1 may be registered (at 102) with UE Redundancy Management System ("URMS") 105. For example, an owner, operator, administrator, etc. associated with UE redundancy group 103 and/or URMS 105 may communicate with URMS 105 via a web portal, an application programming interface ("API"), or other suitable interface in order to register UE 101-1. Registering (at 102) UE 101-1 may include providing an identifier of UE 101-1, such as a Subscription Permanent Identifier ("SUPI"), an International Mobile Station Equipment Identity ("IMEI"), an Internet Protocol ("IP") address, an Mobile Directory Number ("MDN"), a particular set of authentication credentials or portion thereof (e.g., a user name, an authentication token, a public key, etc.), or other identifying information.

Registering (at 102) UE 101-1 may include providing an indication that a new UE redundancy group 103 is to be created, and/or that an existing UE redundancy group 103 should be updated to indicate that UE 101-1 is a primary UE of UE redundancy group 103. In some embodiments, registering (at 102) UE 101-1 may include providing attributes of UE 101-1, such as a device type or category (e.g., mobile phone, IoT device, autonomous vehicle, manufacturing robot, industrial sensor, etc.), information indicating integrated or connected devices (e.g., sensors, peripheral devices, etc.), information regarding antennas or radios associated with UE 101-1 (e.g., quantity of antennas or radios, radio access technologies ("RATs") or frequencies supported by such antennas or radios, an indication of Multiple-Input Multiple-Output ("MIMO") support, etc.), identifiers of applications or other services installed at or supported by UE 101-1, information regarding QoS parameters (e.g., QoS category or group, network slice, SLAs of services provided to UE 101-1, etc.), and/or other attributes or characteristics of UE 101-1. In some embodiments, registering (at 102) UE 101-1 as a primary UE of UE redundancy group 103 may include providing identifiers for one or more UEs that are authorized or allowed to serve as backups for UE 101-1 (e.g., an identifier of UE 101-2 or one or more other UEs).

In some embodiments, as part of the registration (at 102) of UE 101-1, URMS 105 may provide a confirmation, acknowledgement, etc. that UE redundancy group 103 has been created and/or that UE 101-1 is a primary UE of UE redundancy group 103. In some embodiments, URMS 105 may select or generate an identifier for UE redundancy group 103. The group identifier may, for example, include a random or pseudorandom string of characters, an identifier selected from a pool of identifiers, etc. As part of the registration of UE 101-1 (e.g., in conjunction with a confirmation, acknowledgement, etc.), URMS 105 may provide the group identifier to UE 101-1. As such, UE 101-1 may maintain information indicating that UE 101-1 is associated with UE redundancy group 103 (e.g., that UE 101-1 is a primary UE of UE redundancy group 103).

As further shown, UE 101-2 may register (at 104) as a backup UE for UE redundancy group 103. For example, URMS 105 may receive (e.g., from UE 101-1, UE 101-2 and/or from some other device or system) a request to register UE 101-2 as a backup UE for UE redundancy group 103 (e.g., as a backup to primary UE 101-1). As noted above, for instance, UE 101-1 may provide the request and/or information identifying UE 101-2 as part of a registration (at 102) of UE 101-1 as a primary UE for UE redundancy group 103. Additionally, or alternatively, UE 101-2 or some other device or system may provide such request to URMS 105, which may identify UE redundancy group 103 based on identifying that UE 101-1 previously indicated authorization for UE 101-2 to serve as a backup UE for UE redundancy group 103. Additionally, or alternatively, UE 101-2 (or other suitable device or system) may provide an identifier of UE redundancy group 103 when registering UE 101-2. For example, the same entity that registered UE 101-1 may also register UE 101-2, and/or an entity registering UE 101-2 may have received the group identifier from the entity that registered UE 101-1.

As similarly described above with respect to UE 101-1, URMS 105 may further receive or otherwise identify (at 104) attributes of UE 101-2 in conjunction with the registration of UE 101-2. URMS 105 may verify (at 106) that attributes of UEs 101-1 and 101-2 match or are otherwise compatible. For example, URMS 105 may compare some or all received attributes of UE 101-1 to some or all received attributes of UE 101-2 in order to determine whether the attributes match, whether at least a threshold quantity or proportion of attributes match, or whether the attributes of UEs 101-1 and 101-2 are at least a threshold measure of similarity based on a suitable similarity analysis.

As one example, URMS 105 may receive (at 102) information indicating that UE 101-1 is associated with (e.g., includes or is otherwise communicatively coupled to) an accelerometer (e.g., an accelerometer in general, and/or a particular type, make, model, etc. of accelerometer) and a gyroscope (e.g., a gyroscope in general, and/or a particular type, make, model, etc. of gyroscope). Further assume that URMS 105 receives (at 104) information indicating that UE 101-2 is associated with an accelerometer but not a gyroscope. In this example, URMS 105 may reject the registration of UE 101-2 as a backup for UE 101-1, as UE 101-1 does not have a matching set of attributes.

While a simplified example is presented above, in practice, URMS 105 may utilize more complex rules, policies, artificial intelligence/machine learning ("AI/ML") techniques, similarity analyses, etc. to determine whether attributes of UEs 101 of the same UE redundancy group 103 (or same proposed UE redundancy group 103) match. In some embodiments, UEs 101 of different types or having different attributes may be associated with different thresholds or techniques for determining matching attributes. For example, in some situations, only an exact match of UE attributes may be accepted by URMS 105 in order to add a given UE 101 as a backup for a given UE redundancy group 103, while in other situations, URMS 105 may allow a given UE 101 to be added as a backup for a given UE redundancy group 103 even if some attributes are different from a primary UE 101 of such UE redundancy group 103.

In some embodiments, registering (at 104) UE 101-2 may include providing, by URMS 105, an identifier of UE redundancy group 103. In some embodiments, URMS 105 may provide, to UE 101-2, an identifier of UE 101-1 as part of the registration (at 104) of UE 101-2 as a backup UE for UE redundancy group 103. Additionally, or alternatively, URMS 105 may provide, to UE 101-2, some other suitable information based on which UE 101-2 is able to identify or communicate with UE 101-1.

Assuming that URMS 105 verifies, validates, allows, etc. (at 106) the establishment of UE redundancy group 103, URMS 105 may provide (at 108) information specifying UE redundancy group 103, including UE 101-1 as a primary UE and UE 101-2 as a secondary UE, to network 107. Network 107 may register and/or update (at 110) information associated with UE redundancy group 103 and/or one or more other UE redundancy groups 103. As discussed below in more detail, network 107 may use such information in order to seamlessly and quickly resume communications associated with UE 101-1 in situations where UE 101-1 fails, becomes unreachable, disconnects from network 107, etc. For example, network 107 may resume such communications with UE 101-2 in situations where UE 101-1 fails.

In some embodiments, UEs 101-1 and 101-2 may further establish (at 112) a D2D communication link. For example, UE 101-2 may request establishment of a D2D communication link with UE 101-1 after registering (at 104) as a backup UE for UE redundancy group 103. Additionally, or alternatively, UE 101-1 may receive a notification from URMS 105 after UE 101-2 has successfully registered (at 104) as a backup for UE redundancy group 103, and may request establishment of a D2D communication link with UE 101-2 after receiving such notification. In some embodiments, UEs 101-1 and 101-2 may establish (at 112) the D2D communication link independently of the registration (at 102 and/or 104) of UEs 101-1 and/or 101-2.

URMS 105 may accordingly register multiple different UE redundancy groups 103, with each UE redundancy group 103 including respective primary and/or backup UEs 101. In some embodiments, URMS 105 may verify (at 106) that UEs 101 are not in multiple UE redundancy groups 103. For example, when receiving (at 102 and/or 104) registration information associated with UEs 101-1 and 101-2, URMS 105 may verify that UEs 101-1 and 101-2 are not already associated with other UE redundancy groups 103.

Figure 2:
FIG. 2 illustrates example UE redundancy group information, in accordance with some embodiments.

URMS 105 and/or network 107 may accordingly maintain information specifying different UE redundancy groups 103. Data structure 201, shown in FIG. 2, illustrates an example of such information that may be maintained by URMS 105 and/or one or more elements of network 107. Data structure 201 includes information regarding three example UE redundancy groups 103, namely UE redundancy groups 103-1 through 103-3. Data structure 201 may include, for each UE redundancy group 103, a group identifier (represented in the figure as "103-1," "103-2," and "103-3"). Data structure 201 may also include, for each UE redundancy group 103, identifiers of a set of UEs 101 that are included in the group. For example, as discussed above, such identifiers may include SUPI values, IMEI values, MDNs, IP addresses, and/or other suitable identifiers (represented in the figure as "101-1," "101-2," "101-3," and so on). In some embodiments, data structure 201 may indicate, for each UE redundancy group 103, which particular UE 101 is a primary UE for UE redundancy group 103. In this example, the primary UE for UE redundancy group 103-1 is UE 101-1, the primary UE for UE redundancy group 103-2 is UE 101-3, and the primary UE for UE redundancy group 103-3 is UE 101-5.

UEs 101 that are not primary UEs for a given UE redundancy group 103 may be backup UEs for the given UE redundancy group 103. In some embodiments, multiple UEs 101 may be backup UEs for a respective UE redundancy group 103. For example, UEs 101-6 and 101-7 may both be backup UEs for UE redundancy group 103-3. In some embodiments, data structure 201 may list backup UEs 101 sequentially or hierarchically, such as indications of a secondary UE 101, a tertiary UE 101, etc. For example, the secondary UE 101 may become active or primary if the primary UE 101 fails, and the tertiary UE 101 may become active or primary if the primary and secondary UEs 101 both fail.

In some embodiments, data structure 201 may include UE attributes that are shared among UEs 101 of each respective UE redundancy group 103. For example, UEs 101-1 and 101-2 of UE redundancy group 103-1 may both include an accelerometer, UEs 101-3 and 101-4 of UE redundancy group 103-2 may both include a thermometer and may both have the capability of communicating with a Fifth Generation ("5G") network, and UEs 101-5 through 101-7 of UE redundancy group 103-3 may all include a LIDAR sensor and a throttle controller (e.g., a controller of a throttle of an autonomous vehicle or other type of apparatus).

In some embodiments, URMS 105 may utilize or refer to the attributes of a given UE redundancy group 103 when verifying whether a given UE 101 should be added or registered to UE redundancy group 103. For example, a particular UE 101 that includes or meets such attributes of a given UE redundancy group 103 may be approved, allowed, etc., while a UE 101 that does not include or otherwise meet such attributes may be rejected, not allowed, etc. to be added to such UE redundancy group 103. In some embodiments, network 107 may utilize or refer to the attributes of a given UE redundancy group 103 when facilitating a resumption of communications between a particular UE redundancy group 103 and network 107, such as when a primary UE 101 of such UE redundancy group 103 has failed or otherwise become unreachable. For example, network 107 may implement different measures to facilitate such resumption of communications based on different attributes of the group. For example, network 107 may take more intensive measures to resume communications for a first UE redundancy group 103 with a first set of attributes (e.g., a set of "mission critical" attributes) and may take less intensive measures to resume communications for a second UE redundancy group 103 with a second set of attributes (e.g., a non-"mission critical" set of attributes).

Figure 3:
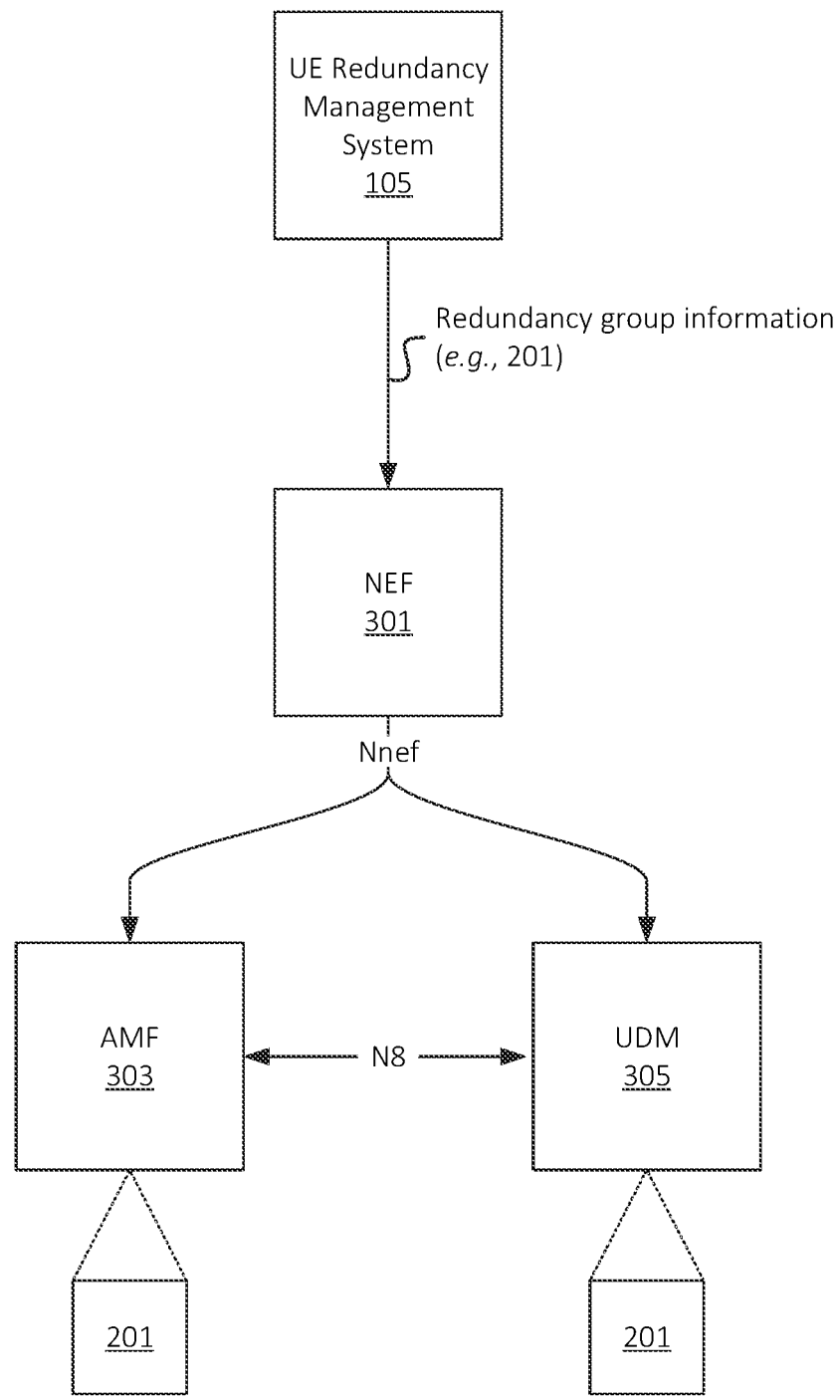
FIG. 3 illustrates example communications between elements of a network in order to maintain or provide UE redundancy group information, in accordance with some embodiments.

As noted above, one or more elements of network 107 may receive and/or maintain information specifying UE redundancy groups 103 (e.g., an instance of data structure 201, a portion thereof, and/or some other suitable data structure). As shown in FIG. 3, for example, URMS 105 may provide information regarding UE redundancy groups 103 to Network Exposure Function ("NEF") 301, which may serve as an interface between network 107 (e.g., a core of a wireless network) and devices or systems external to network 107, such as URMS 105. NEF 301 may, for example, maintain information indicating that URMS 105 is authorized to interact with, send and/or receive information to and/or from, etc. one or more elements of the core network, such as Access and Mobility Management Function ("AMF") 303, Unified Data Management function ("UDM") 305, and/or other suitable elements of the core network.

NEF 301 may provide, forward, etc. some or all of the information specifying UE redundancy groups 103 to one or more elements of network 107. For example, NEF 301 may provide the information to AMF 303, UDM 305, and/or one or more other elements of network 107 (e.g., via an Nnef interface or other suitable communication pathway). In some embodiments, NEF 301 may provide the information specifying UE redundancy groups 103 to UDM 305, and UDM 305 may provide some or all of the information to AMF 303 (e.g., via an N8 interface). For example, AMF 303 may request information regarding a particular UE 101 during a registration procedure associated with UE 101, a session establishment or re-establishment procedure associated with UE 101, and/or at some other time or based on some other event. UDM 305 may identify a particular UE redundancy group 103 with which such UE 101 is associated, and may provide group information regarding the particular UE redundancy group 103 to AMF 303. In this manner, AMF 303 may not necessarily store all group information that has been provided to network 107 (e.g., has been provided to NEF 301), but may store information specifying UE redundancy groups 103 for particular UEs 101 that are managed by or are otherwise in communication with AMF 303. As discussed below, the information regarding UE redundancy groups 103 may be used by network 107 to prioritize and/or otherwise facilitate enhanced resumption of services provided to a primary UE 101 of a given UE redundancy group 103 when the primary UE 101 fails or becomes otherwise unreachable (e.g., where such services are resumed via a backup UE 101 of UE redundancy group 103).

Figure 4:
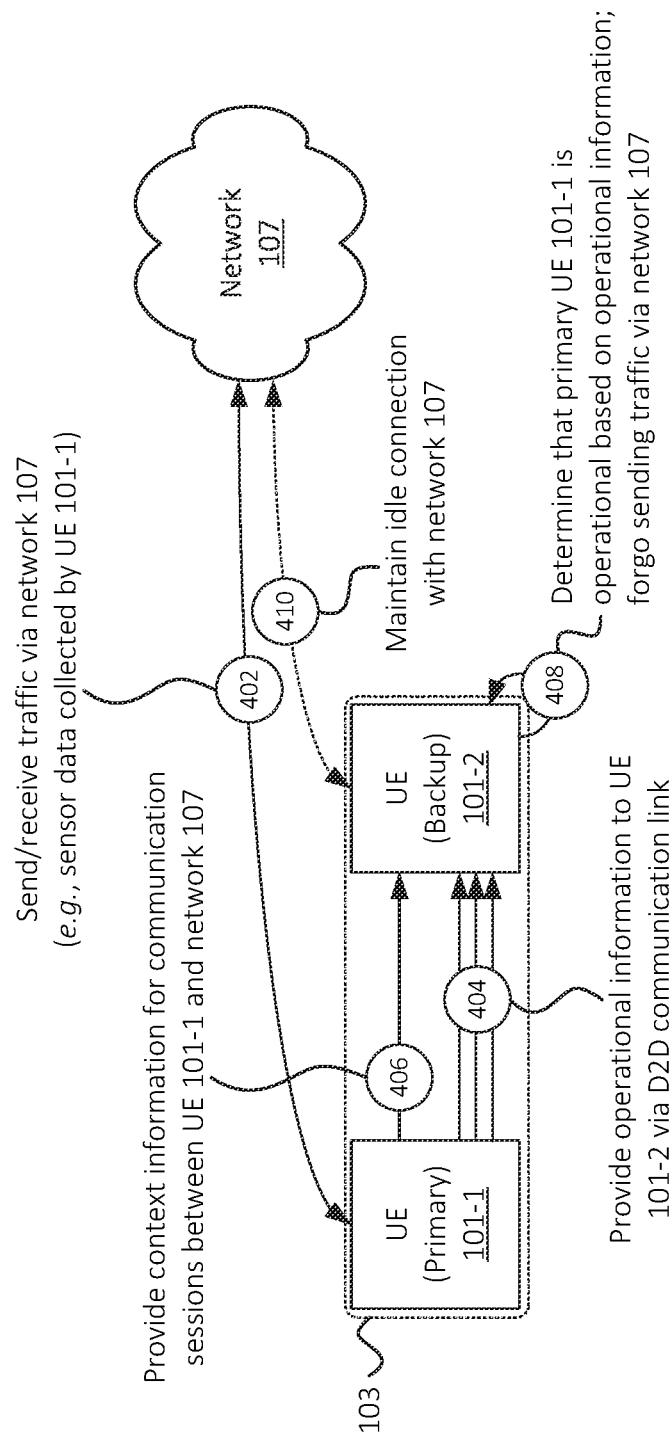
FIG. 4 illustrates an example of a backup UE of a UE redundancy group maintaining a reduced connection with a network when a primary UE of the group is operational, in accordance with some embodiments.
Figure 5:
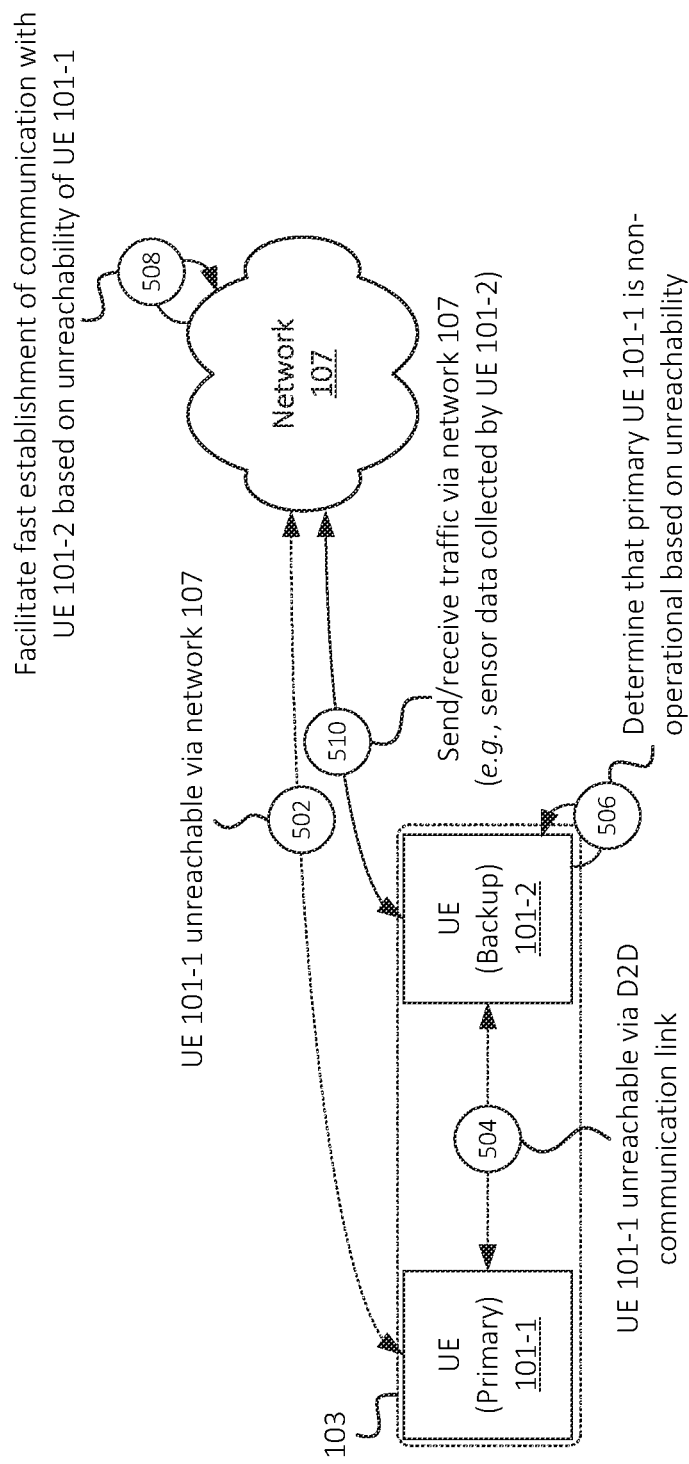
FIGS. 5 and 6 illustrate examples of a backup UE resuming communications previously associated with a primary UE when the primary UE becomes non-operational, in accordance with some embodiments.

FIG. 4 illustrates an example of communications between UEs 101-1 and 101-2, of a particular UE redundancy group 103, and network 107 in situations where UE 101-1 is operational (e.g., is reachable, is available, has not failed, etc.). As shown, UE 101-1 may send and/or receive traffic via network 107. For example, UE 101-1 may communicate with an application server via network 107, a MEC, another UE 101, and/or some other device or system. As one example, UE 101-1 may include or be communicatively coupled to a set of sensors that sense and/or collect sensor data via one or more sensors. Such sensor data may include, for example, motion detection data, movement or impact detection data, acceleration data, location data, temperature data, pressure data, and/or one or more other types of measurements, sensor readings, etc. As similarly discussed above, UE 101-2 may include or be communicatively coupled to the same set of sensors, and/or sensors of the same type, as UE 101-1. As such, UE 101-2 may collect the same sensor data, and/or may otherwise collect sensor data from the same sources or phenomena, as UE 101-1.

While UE 101-1 is in an "operational" status, UE 101-1 may communicate (at 402) via network 107, which may include outputting sensor data or other traffic, receiving traffic such as instructions or other feedback generated based on the sensor data, and/or other suitable communications. UE 101-1 may be operational in that UE 101-1 has connectivity to network 107, is able to send and/or receive traffic via network 107, is able to perform processing or communications with at least a threshold measure of performance or availability, etc. Network 107 may further maintain information indicating that UE 101-1 is operational, is available, is reachable, etc. For example, a particular AMF 303 of network 107 may maintain an operational status of UE 101-1 based on communicating with UE 101-1 and/or based on other suitable techniques.

UE 101-1 may further provide (at 404) operational information to UE 101-2 via a D2D communication link between UEs 101-1 and 101-2. For example, as discussed above, UEs 101-1 and 101-2 may have established the D2D communication link based on a registration procedure with URMS 105 and/or based on some other suitable procedure. In some embodiments, the D2D link be include or may be implemented by a "direct" connection between UEs 101-1 and 101-2, such as a Bluetooth connection, a WiFi Direct connection, or the like. In some embodiments, the D2D link may include or may traverse one or more networks, such as a Personal Area Network ("PAN"), a cellular network, network 107 (e.g., a prioritized network slice associated with network 107, such that D2D communications between UEs 101-1 and 101-2 take precedence over one or more other types of communications handled by network 107), and/or one or more other networks.

The operational information provided (at 404) by UE 101-1 may include status messages, "heartbeat" or "keepalive" messages, pings, performance metrics, and/or other types of messages that indicate that UE 101-1 is operational, available, reachable, etc. In some embodiments, UE 101-1 may provide the operational information to UE 101-2 based on information (e.g., as received from URMS 105, UE 101-2, and/or some other source) indicating that UE 101-2 is in the same UE redundancy group 103 as UE 101-1, and/or that UE 101-2 is otherwise a backup UE with respect to primary UE 101-1. In some embodiments, UE 101-1 may automatically "push" (at 404) the operational information to UE 101-2 periodically, intermittently, based on the occurrence of one or more events, and/or on some other suitable basis. Additionally, or alternatively, UE 101-2 may request operational information from UE 101-1 (e.g., periodically, intermittently, etc.), and UE 101-1 may respond with the operational information.

In some embodiments, UE 101-1 may provide (at 406) context information for one or more communication sessions between UE 101-1 and network 107. For example, UE 101-1 may provide one or more protocol data unit ("PDU") session identifiers, an indication of one or more network elements (e.g., User Plane Functions ("UPFs"), Packet Data Network ("PDN") Gateways ("PGWs"), etc.) associated with such communication sessions, Tunnel Endpoint Identifiers ("TEIDs") associated with UE 101-1 and/or one or more elements of network 107, and/or other suitable context information. As discussed below, UE 101-2 may, in some embodiments, utilize some or all of this context information in order to seamlessly resume communications with network 107 in the event that UE 101-1 becomes non-operational, unreachable, unavailable, etc.

Based on receiving (at 404) operational information from UE 101-1 (e.g., on an ongoing basis), UE 101-2 may determine that UE 101-1 is operational, and may forgo (at 408) sending traffic or communicating via network 107. For example, while UEs 101-1 and 101-2 may both collect, record, sense, or otherwise generate the same information to be sent via network 107, UE 101-2 may forgo (at 408) sending such information via network 107 since UE 101-1 is operational and is thus able to provide the information via network 107. In some embodiments, UE 101-2 may buffer, cache, etc. some or all such information. As discussed below, UE 101-2 may utilize the buffered, cached, etc. information in situations where UE 101-2 resumes communications that were previously conducted by UE 101-1 (e.g., reporting sensor information, receiving control information, or other types of communications).

UE 101-2 may, in some embodiments, maintain (at 410) an idle network connection with network 107 while UE 101-1 is operational. For example, UE 101-2 may be associated with one or more radio bearers between UE 101-2 and a RAN associated with network 107 in an "idle" mode, may be in a "low power" radio mode, may be in an inactive mode (e.g., a Radio Resource Control ("RRC") INACTIVE mode), may be in a reduced paging mode, or the like. Generally, the idle mode, low power mode, etc. may consume fewer network resources of the RAN, may include fewer communications between UE 101-2 and the RAN or network 107 (e.g., paging messages, status messages, etc.), may consume less battery power of UE 101-2, etc. as compared to an "active" mode. In some embodiments, UE 101-2 may maintain an active mode connection, but may forgo outputting traffic via network 107 that is the same or similar to traffic that is sent by UE 101-1 (e.g., sensor readings or other traffic associated with attributes shared by UEs 101-1 and 101-2). In this manner, although UE 101-2 is in active mode, resource consumption may be less than if UE 101-2 were to output traffic while in the active mode, in accordance with some embodiments.

At some point, UE 101-1 may (at 502) fail, become unreachable, may become non-operational, etc. For example, a battery of UE 101-1 may lose power, an electrical failure may occur with respect to UE 101-1, UE 101-1 may lose wireless connectivity due to a physical obstruction, UE 101-1 may experience a software error, or may otherwise become unable to communicate via network 107. UE 101-2 may accordingly identify (at 504) that UE 101-1 is unreachable via the D2D link between UEs 101-1 and 101-2. For example, UE 101-2 may determine that a timeout has occurred between operational messages from UE 101-1, may identify that UE 101-1 has not responded to a request (e.g., via the D2D link) for operational messages, and/or may otherwise determine that UE 101-1 is not reachable via the previously established D2D link. Based on determining (at 504) that UE 101-1 is unreachable via the D2D link, UE 101-2 may determine (at 506) that UE 101-1 is non-operational, has failed, etc.

Network 107 may also determine that UE 101-1 has become non-operational, based on not receiving traffic from UE 101-1 for at least a threshold amount of time, based on AMF 303 detecting that UE 101-1 is unreachable, etc. Additionally, or alternatively, network 107 may determine that UE 101-1 is non-operational based on a notification from UE 101-2. For example, UE 101-2 may output an indication to AMF 303 (e.g., via an N1 interface, via Non-Access Stratum ("NAS") signaling, etc.) that UE 101-1 is not reachable via the D2D link. Additionally, or alternatively, UE 101-2 may output a request (e.g., to AMF 303) to establish a communication session between UE 101-2 and network 107, and/or may output a request to modify one or more existing communication sessions between UE 101-2 and network 107 (e.g., to switch to an active mode from an idle mode). Based on receiving such request, and further based on maintaining (e.g., as discussed above with respect to data structure 201) information indicating that UE 101-2 is a backup UE for UE 101-1, network 107 may determine that UE 101-1 has become non-operational.

Figure 6:
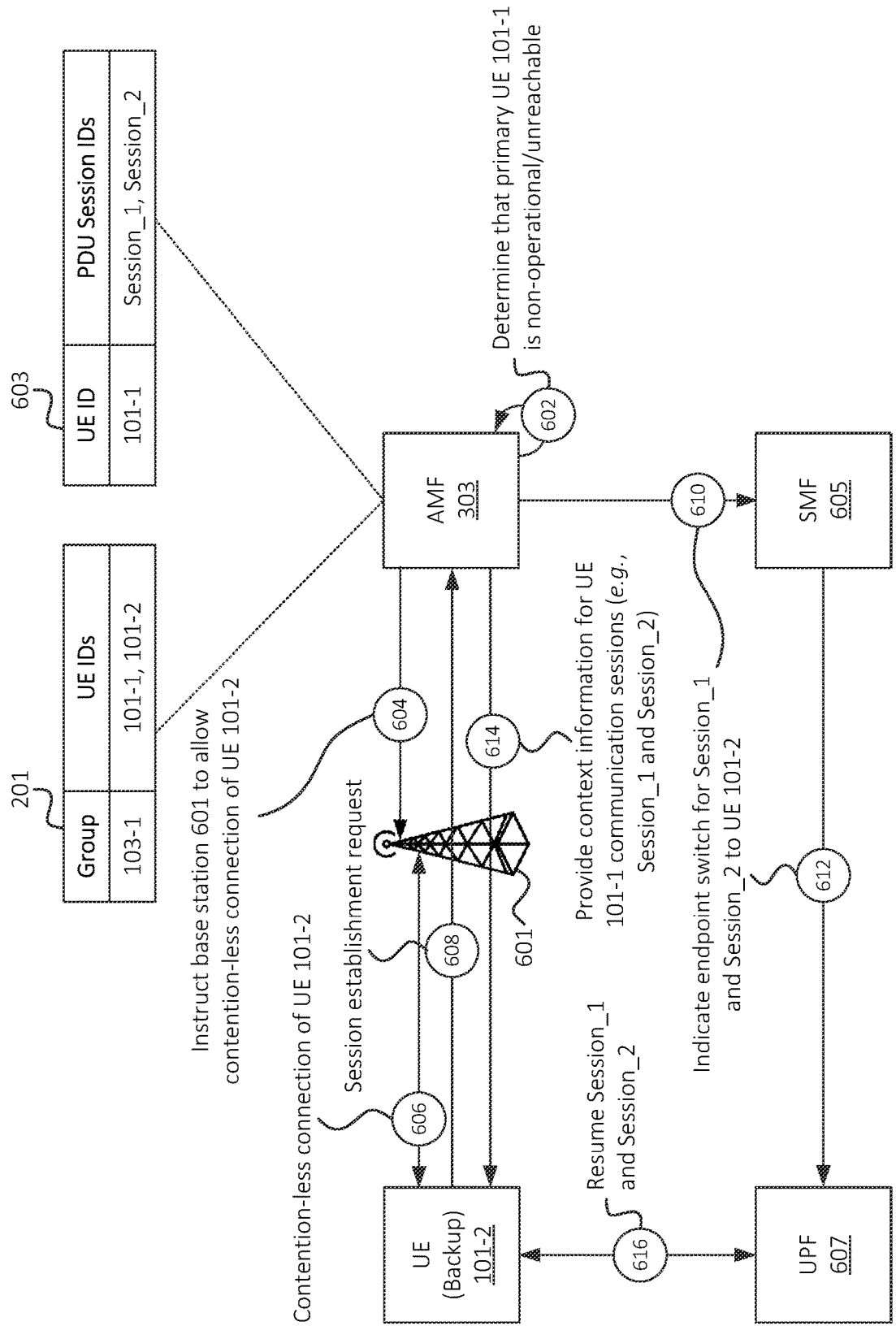

Based on detecting that UE 101-1 has become non-operational, network 107 may facilitate (at 508) fast establishment of communications with UE 101-2. FIG. 6, discussed below, provides examples of fast establishment of communications between UE 101-2 and network 107 in accordance with some embodiments. Generally, network 107 may prioritize the establishment, re-establishment, modification (e.g., from idle mode to active mode), etc. of communications between UE 101-2 and network 107 in order to maintain the high availability and uptime of UE redundancy group 103, even though primary UE 101-1 has become non-operational. In some embodiments, UE 101-2 may use the previously received context information in order to utilize some or all of the same communication sessions (e.g., PDU sessions or other sessions) with network 107 as UE 101-1. In this manner, network 107 may avoid expending the time and resources to establish new communication sessions with UE 101-2, and may instead reuse communication sessions that were previously established for UE 101-1.

Once communications have been established between UE 101-2 and network 107 (e.g., active mode communications, UE 101-2 may send and/or receive (at 510) traffic via network 107. For example, UE 101-2 may send sensor readings or other suitable traffic via network 107 to the same destination as traffic was sent by UE 101-1. In some embodiments, UE 101-2 may send cached or buffered traffic, which may include, for example, sensor readings that were taken by UE 101-2 after UE 101-2 determined (at 506) that UE 101-1 is non-operational and before UE 101-2 establishes communications with network 107. In this manner, even in situations where a gap in communications occurs while UE 101-2 connects to network 107, the actual traffic sent by UEs 101 of UE redundancy group 103 may be uninterrupted, or relatively seamless, from the standpoint of an application server or other device receiving such traffic.

As noted above, the resumption of communications associated with non-operational primary UE 101-1, by backup UE 101-2, may be facilitated by network 107. For example, as shown in FIG. 6, AMF 303 may determine (at 602) that UE 101-1 is non-operational and/or unreachable. For example, UE 101-1 may not respond to paging messages from AMF 303, and/or AMF 303 may determine that UE 101-1 is non-operational in some other suitable manner. AMF 303 may, in some embodiments, instruct (at 604) a particular base station 601 to allow a contention-less connection or registration of UE 101-2, and/or to otherwise prioritize connection, registration, etc. of UE 101-2. AMF 303 may, in some embodiments, identify that UE 101-2 is a backup UE with respect to UE 101-1, which has failed, based on group information stored in data structure 201. AMF 303 may identify that UE 101-2 is currently connected to base station 601 (e.g., in an idle mode, an RRC INACTIVE mode, etc.), may identify a connection request from UE 101-2 via base station 601, may use AI/ML modeling techniques to predict or estimate that UE 101-2 is located in a coverage area associated with base station 601, and/or may otherwise identify that UE 101-2 is connected to, is requesting connection to, or is likely to connect to base station 601.

Based on the instruction (received at 604), base station 601 may participate in or facilitate (at 606) a contention-less and/or otherwise accelerated establishment of communications between UE 101-2 and base station 601. For example, the contention-less establishment of communications may include reduced communications or messages, such as authentication-related messages, between UE 101-2 and base station 601 (and/or between UE 101-2 and AMF 303). For example, the contention-less and/or otherwise accelerated establishment of communications between UE 101-2 and base station 601 may include omitting one or more messages that may otherwise be required for establishing communications, such as a UECapabilityEnquiry and/or UECapability messages (e.g., requests and responses associated with such messages) may be omitted (or otherwise not or sent as part of a communication establishment procedure) between UE 101-2 and AMF 303. As another example, messages between UE 101-2 and base station 601, to establish, allocate, etc. wireless channels between UE 101-2 and base station 601 may be reduced or omitted. For example, such communications between UE 101-2 and base station 601 may omit messages associated with establishing a Physical Uplink Control Channel ("PUCCH"), Sounding Reference Signals ("SRS"), Discontinuous Reception ("DRX"), code book configuration, carrier aggregation ("CA"), dual connectivity ("DC"), RRC Reconfiguration, RRC Resume, and/or other messages associated with communications or wireless resources between UE 101-2 and base station 601.

In some embodiments, UE 101-2 may request that a connection mode or status between UE 101-2 and base station 601 be changed. For example, UE 101-2 may request that a connection between UE 101-2 be changed from an idle mode, an RRC INACTIVE mode, a "low power" mode, etc., to a different mode, such as an active mode, an RRC CONNECTED mode, etc.

UE 101-2 may also communicate with AMF 303 in conjunction with, or subsequent to, the connection (at 606) of UE 101-2 to base station 601. For example, UE 101-2 may output (at 608) a session establishment request (e.g., a PDU Session Establishment Request message or some other suitable type of communication session establishment request) to AMF 303 via NAS messaging, via an N1 interface, etc. In some embodiments, the session establishment request may include an identifier of sessions (e.g., PDU sessions, represented by the example identifiers "Session_1" and "Session_2" in this figure) associated with UE 101-1. For example, as discussed above, in some embodiments, UE 101-2 may receive context information from UE 101-1, indicating identifiers of communication sessions with which UE 101-1 is associated. In some embodiments, the communications (at 608) between UE 101-2 and AMF 303 may include UE 101-2 providing one or more identifiers of UE 101-2, such as a SUPI, an MDN, or the like. In some embodiments, UE 101-2 may provide (at 608) an identifier of a particular UE redundancy group 103 (i.e., UE redundancy group 103-1, in this example) with which UE 101-2 is associated. In some embodiments, UE 101-2 may provide (at 608) an indication that UE 101-2 is a backup for UE 101-1, and/or that UE 101-2 has detected (e.g., via a D2D communication link or a disruption thereof) that UE 101-1 has failed, has become unreachable, etc. In this manner, AMF 303 may be "aware" that UE 101-2 is serving as a backup for UE 101-1 which has failed, and is thus resuming communications that were previously associated with UE 101-1.

In some embodiments, in addition to or in lieu of receiving information UE 101-2 regarding communication sessions associated with UE 101-1, AMF 303 may receive or maintain information, such as example data structure 603, indicating communication sessions with which UE 101-1 (e.g., UE redundancy group 103) is associated from some other source. For example, AMF 303 may receive such information from Session Management Function ("SMF") 605 or some other device or system. For example, data structure 603 may include identifiers such as session identifiers (represented by "Session 1" and "Session 2" in this figure) of PDU sessions or other types of communication sessions with which UE 101-1 is associated. AMF 303 may, in some embodiments, identify that the session establishment request (received at 608) is associated with resuming communications associated with UE 101-1 based on identifying that UE 101-2 is in UE redundancy group 103-1. Additionally, or alternatively, AMF 303 may identify that the session establishment request (received at 608) is associated with resuming communications associated with UE 101-1 based on identifying (at 602) that UE 101-1 has failed. Additionally, or alternatively, AMF 303 may identify that the session establishment request (received at 608) is associated with Session_1 and Session_2 (e.g., communication sessions associated with UE 101-1) based on identifying that UEs 101-1 and 101-2 are in the same UE redundancy group 103-1, that UE 101-1 has failed, and further that UE 101-1 is associated with Session_1 and Session_2. That is, since UEs 101-1 and 101-2 are in the same group, and further since UE 101-1 has failed, AMF 303 may identify that the request (received from UE 101-2 at 608) is a request for UE 101-2 to resume communications previously associated with UE 101-1.

AMF 303 may accordingly indicate (at 610) an endpoint switch for Session_1 and Session_2, which were previously associated with UE 101-1 which has been identified (at 602) as having failed, becoming non-operational, etc. For example, AMF 303 may indicate that instead of Session_1 and Session_2 being associated with UE 101-1 as an endpoint, that Session_1 and Session_2 are now associated with UE 101-2 as an endpoint. AMF 303 may, for example, provide (at 610) such information to a network element of network 107 that manages the establishment, modification, etc. of communication sessions, such as SMF 605. The endpoint information may include, for example, one or more IP addresses associated with UE 101-2, a TED associated with UE 101-2, and/or other suitable information via which UE 101-2 may be reached via network 107.

SMF 605 may accordingly instruct or indicate (at 612) the endpoint switch to a network element of network 107 that routes, forwards, handled, etc. user plane traffic, such as User Plane Function ("UPF") 607. In this manner, UPF 607 may be configured to communicate (e.g., via network 107) with UE 101-2 instead of UE 101-1. That is, for example, UPF 607 may receive, accept, forward, etc. traffic sent from UE 101-2 via Session_1 and Session 2, and further may output, forward, etc. traffic associated with Session_1 and Session_2 to UE 101-2 (e.g., in lieu of to UE 101-1).

Although not explicitly shown in FIG. 6 for the sake of clarity, SMF 605 may respond to AMF 303 with an acknowledgement indicating that the endpoint for Session_1 and Session_2 has been switched to UE 101-2 (e.g., from UE 101-1). Additionally, or alternatively, SMF 605 may respond to AMF 303 with one or more identifiers of UPF 607, such as an IP address, a TED, or other suitable identifying information. AMF 303 may output (at 614) context information for the communication sessions, that were previously associated with UE 101-1, to UE 101-2. For example, in embodiments where UE 101-2 did not previously receive or maintain session identifiers associated with such communication sessions, UE 101-2 may receive (at 614) such identifiers. Additionally, or alternatively, AMF 303 may provide (at 614) other context information, such as an IP address or other suitable identifying information for UPF 607. In this manner, UE 101-2 and UPF 607 may both be "aware" that communication sessions, previously associated with UE 101-1, are now associated with UE 101-2. Further, as UE 101-2 and UPF 607 may have both received endpoint information for such communication sessions (i.e., UPF 607 may have received information associating UE 101-2 with Session_1 and Session_2, and/or UE 101-2 may have received information associating UPF 607 with Session_1 and Session_2), UE 101-2 and UPF 607 may be able to communicate (at 616) via network 107 without further establishment of communication sessions or other control signaling. Since UE 101-2 has, in some embodiments, the same or similar set of attributes as UE 101-1, and further since UE 101-2 is communicating with UPF 607 using some or all of the same context information as previously associated with communications between UPF 607 and UE 101-1, the communications (at 616) between UE 101-2 and UPF 607 may be considered as a resumption of communications associated with UE redundancy group 103.

Figure 7:
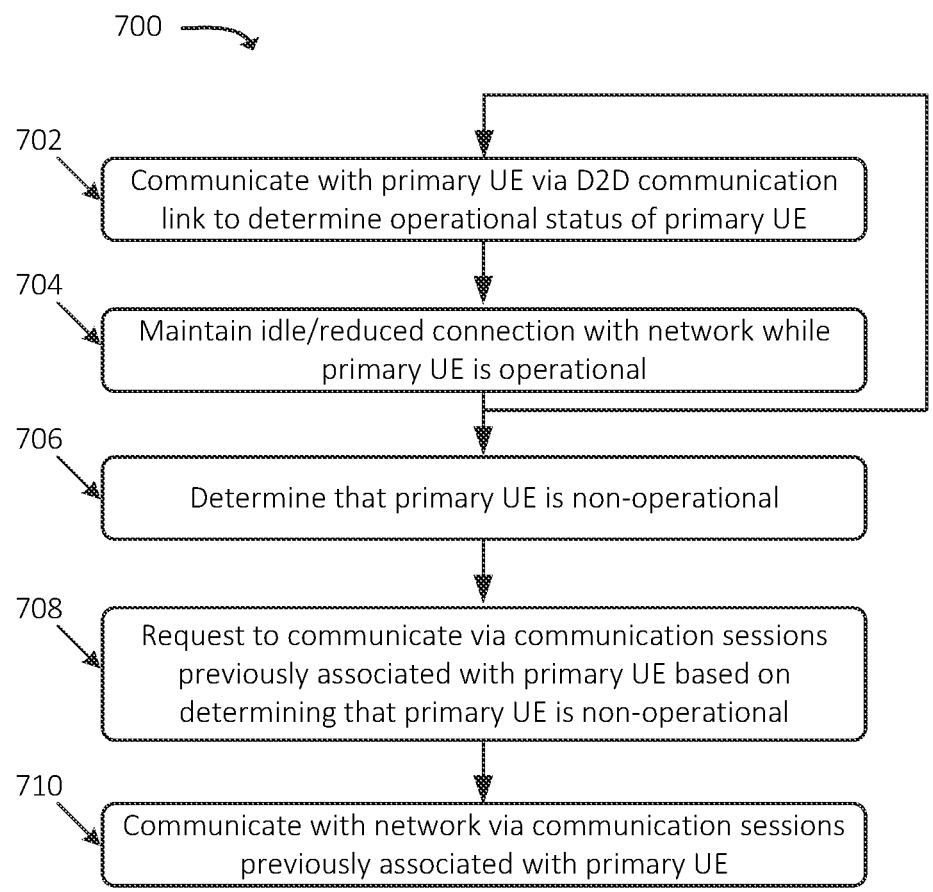
FIG. 7 illustrates an example process for implementing a UE redundancy group, in accordance with some embodiments.

FIG. 7 illustrates an example process 700 for implementing backup communications associated with one or more UE redundancy groups 103. In some embodiments, some or all of process 700 may be performed by UE 101 (e.g., a backup UE 101-2 of a particular UE redundancy group 103). In some embodiments, one or more other devices may perform some or all of process 700 in concert with, and/or in lieu of, UE 101-2.

As shown, process 700 may include communicating (at 702) with a primary UE 101 (e.g., UE 101-1, in the preceding examples) via a D2D communication link in order to determine an operational status of the primary UE 101. For example, UEs 101-1 and 101-2 may communicate via a Sidelink connection, via network 107 or some other network, via WiFi direct, via Bluetooth, and/or via some other suitable communication pathway. As discussed above, UE 101-2 may determine an operational status of UE 101-1 (e.g., whether UE 101-1 is operational and/or an extent to which UE 101-1 is operational, such as performance or load metrics associated with UE 101-1) based on the communication link with UE 101-1. As discussed above, UEs 101-1 and/or 101-2 may register (e.g., with URMS 105 or some other device or system) as a particular UE redundancy group 103, which may include indicating that UE 101-1 is a primary UE and that UE 101-2 is a backup UE for UE redundancy group 103. As discussed above, URMS 105 may have verified that UE 101-2 is eligible to serve as a backup for UE 101-1, such as by verifying that attributes of UE 101-2 match or otherwise satisfy attributes of UE 101-1, which may include verifying that UE 101-2 is able to collect or report the same types of sensor data as UE 101-1 or other suitable attributes or capabilities.

In some embodiments, UE 101-2 may receive context information associated with the communication sessions with which UE 101-1 is associated. Such context information may include session identifiers (e.g., PDU session identifiers), Public Land Mobile Network ("PLMN") identifiers, network slice identifiers (e.g., Network Slice Selection Assistance Information ("NSSAI") values), endpoint identifiers of one or more UPFs 607 or other network elements associated with the communication sessions, or other suitable context information.

Process 700 may further include maintaining (at 704) an idle or otherwise reduced connection with network 107 while primary UE 101-1 is operational. For example, as discussed above, UE 101-2 may be connected to network 107 (e.g., a RAN of network 107) in an idle mode, a low power mode, an RRC INACTIVE mode, etc. UE 101-2 may maintain the idle and/or reduced connection in order to conserve battery power, network resources, etc. in situations where UE 101-1 is operational. Blocks 702 and 704 may repeat and/or continue on an ongoing basis, such that UE 101-2 is able to monitor the operational status of primary UE 101-1 on an ongoing and real time or near-real time basis.

Process 700 may additionally include determining (at 706) that primary UE 101-1 is non-operational. For example, UE 101-2 may determine that UE 101-1 has not responded to or sent any messages to UE 101-1 (e.g., via the D2D link) for at least a threshold amount of time, or may otherwise determine that UE 101-1 is non-operational, unavailable, unreachable, etc. In some embodiments, one or more elements of network 107 may determine that UE 101-1 is non-operational, unavailable, unreachable, etc. in addition to, or in lieu of, UE 101-2 determining that UE 101-1 is non-operational.

Process 700 may also include requesting (at 708) to communicate via the communication sessions previously associated with primary UE 101-1 based on determining that UE 101-1 is non-operational. For example, UE 101-2 may request the establishment or modification of one or more sessions (e.g., to AMF 303) between UE 101-2 and network 107. In some embodiments, UE 101-2 may include some or all of the context information associated with the communication sessions previously associated with UE 101-1, such as a session identifier, endpoint information for the communication sessions (e.g., associated with one or more UPFs 607), network slice information, or other suitable information. In some embodiments, UE 101-2 may request a switch of a radio connection mode between UE 101-2 and base station 601, such as a switch from an idle, inactive, etc. mode to an active, connected, etc. mode.

In some embodiments, UE 101-2 may not be connected to base station 601 while UE 101-1 is operational, and may request a new connection to base station 601 based on determining (e.g., at 706) that UE 101-2 is non-operational. As discussed above, one or more elements of network 107 (e.g., AMF 303 and/or some other network element) may have identified that UE 101-1 is non-operational, and may have instructed base station 601 to expedite a connection procedure with UE 101-2, which is in the same UE redundancy group 103 (e.g., is a backup UE for UE redundancy group 103) as UE 101-1. Accordingly, base station 601 may expedite the connection of UE 101-2 (and/or the switch from idle mode to active mode), such as by allowing a contentionless connection or otherwise reducing signaling between base station 601 and UE 101-2.

In some embodiments, network 107 may modify the communication sessions previously associated with UE 101-1 to now be associated with UE 101-2. For example, network 107 may modify endpoint information associated with the communication sessions to indicate that UE 101-2 is an endpoint of the communication sessions in lieu of UE 101-1. In some embodiments, UPF 607 may receive the updated endpoint information, such that UPF 607 is able to identify that communications received from UE 101-2 are authorized to be received via such communication sessions, and is further able to provide communications associated with these communication sessions to UE 101-2.

Process 700 may further include communicating (at 710) with network 107 via the communication sessions previously associated with primary UE 101-1. For example, as discussed above, UE 101-2 may communicate with UPF 607 using context information (e.g., endpoint identifiers, PDU session identifiers, etc.) associated with communications previously associated with UE 101-1. In some embodiments, UE 101-2 may determine a time at which UE 101-2 determined (at 706) that UE 101-1 become non-operational, and may output (at 710) traffic, such as sensor readings, that was generated at or is otherwise associated with the time at which UE 101-2 determined that UE 101-1 become non-operational.

For example, assume that UE 101-2 collects 15 sensor readings per second, and further that UE 101-2 determines (at 706) at 12:00:00 that UE 101-1 is non-operational. Further assume that UE 101-2 receives a notification (e.g., from AMF 303) at 12:00:02 that requested communication sessions have been modified or established with respect to UE 101-2. Once UE 101-2 is in communication with network 107 (e.g., UPF 607) UE 101-2 may output 30 sensor readings (e.g., to an application server or other destination) via network 107, to cover the two seconds between 12:00:00 and 12:00:02.

Figure 8:
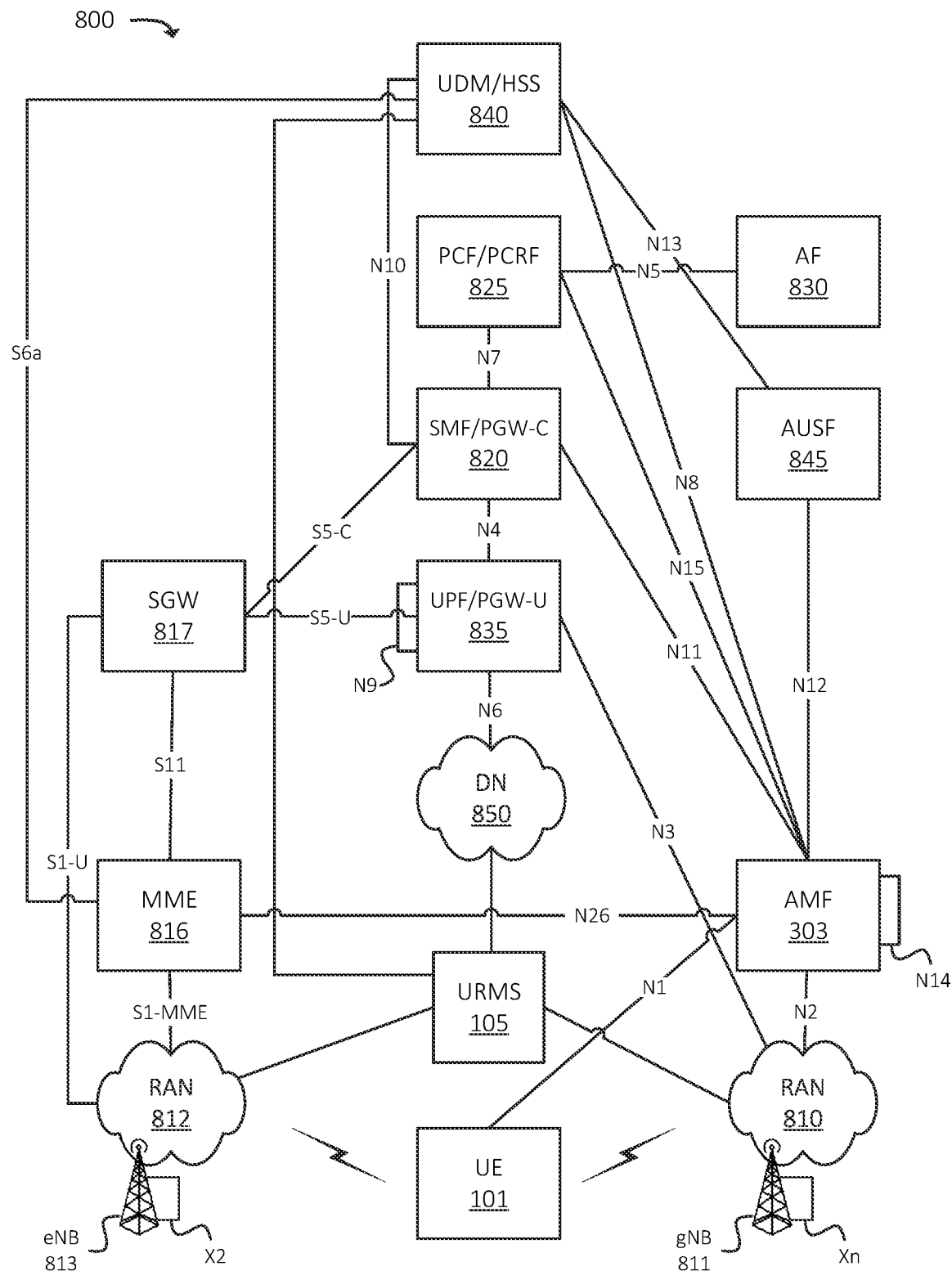
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 800 may represent or may include a 5G core ("5GC"). In some embodiments, environment 800 or portions thereof may be, may include, may represent, etc. network 107 and/or one or more portions thereof.

As shown, environment 800 may include UE 101, RAN 810 (which may include one or more Next Generation Node Bs ("gNBs") 811), RAN 812 (which may include one or more evolved Node Bs ("eNBs") 813), and various network functions such as AMF 303, Mobility Management Entity ("MIME") 816, Serving Gateway ("SGW") 817, SMF/Packet Data Network ("PDN") Gateway ("PGW")-Control plane function ("PGW-C") 820, Policy Control Function ("PCF")/Policy Charging and Rules Function ("PCRF") 825, Application Function ("AF") 830, UPF/PGW-User plane function ("PGW-U") 835, UDM/Home Subscriber Server ("HSS") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as URMS 105.

The example shown in FIG. 8 illustrates one instance of each network component or function (e.g., one instance of SMF/PGW-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF/PGW-C 820, PCF/PCRF 825, UPF/PGW-U 835, UDM/HSS 840, and/or AUSF 845, while another slice may include a second instance of SMF/PGW-C 820, PCF/PCRF 825, UPF/PGW-U 835, UDM/HSS 840, and/or AUSF 845). The different slices may provide differentiated levels of service, such as service in accordance with different QoS parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 101 may include a computation and communication device, such as a wireless mobile communication device that is capable of communicating with RAN 810, RAN 812, and/or DN 850. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 101 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 101 may communicate with one or more other elements of environment 800. UE 101 may communicate with RAN 810 via an air interface (e.g., as provided by gNB 811). For instance, RAN 810 may receive traffic (e.g., voice call traffic, data traffic, messaging traffic, signaling traffic, etc.) from UE 101 via the air interface, and may communicate the traffic to UPF/PGW-U 835, and/or one or more other devices or networks. Similarly, RAN 810 may receive traffic intended for UE 101 (e.g., from UPF/PGW-U 835, AMF 303, and/or one or more other devices or networks) and may communicate the traffic to UE 101 via the air interface. In some embodiments, base station 601 may be, may include, and/or may be implemented by one or more gNBs 811.

RAN 812 may be, or may include, a LTE RAN that includes one or more base stations (e.g., one or more eNBs 813), via which UE 101 may communicate with one or more other elements of environment 800. UE 101 may communicate with RAN 812 via an air interface (e.g., as provided by eNB 813). For instance, RAN 812 may receive traffic (e.g., voice call traffic, data traffic, messaging traffic, signaling traffic, etc.) from UE 101 via the air interface, and may communicate the traffic to UPF/PGW-U 835, and/or one or more other devices or networks. Similarly, RAN 812 may receive traffic intended for UE 101 (e.g., from UPF/PGW-U 835, SGW 817, and/or one or more other devices or networks) and may communicate the traffic to UE 101 via the air interface. In some embodiments, base station 601 may be, may include, and/or may be implemented by one or more eNBs 813.

AMF 303 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 810 and/or gNBs 811, and/or to perform other operations. In some embodiments, the 5G network may include multiple AMFs 303, which communicate with each other via the N14 interface (denoted in FIG. 8 by the line marked "N14" originating and terminating at AMF 303).

MME 816 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 101. In some embodiments, the establishment of communications sessions may be performed in accordance with one or more policies provided by PCF/PCRF 825. In some embodiments, SMF 605 may be, may include, and/or may be implemented by SMF/PGW-C 820.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 101, from DN 850, and may forward the user plane data toward UE 101 (e.g., via RAN 810, SMF/PGW-C 820, and/or one or more other devices). In some embodiments, multiple UPFs 835 may be deployed (e.g., in different geographical locations), and the delivery of content to UE 101 may be coordinated via the N9 interface (e.g., as denoted in FIG. 8 by the line marked "N9" originating and terminating at UPF/PGW-U 835). Similarly, UPF/PGW-U 835 may receive traffic from UE 101 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835. In some embodiments, UPF 607 may be, may include, and/or may be implemented by UPF/PGW-U 835.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. AUSF 845 and/or UDM/HSS 840 may perform authentication, authorization, and/or accounting operations associated with the subscriber and/or a communication session with UE 101. In some embodiments, UDM 305 may be, may include, and/or may be implemented by UDM/HSS 840.

DN 850 may include one or more wired and/or wireless networks. For example, DN 850 may include an Internet Protocol IP-based PDN, a wide area network ("WAN") such as the Internet, a private enterprise network, and/or one or more other networks. UE 101 may communicate, through DN 850, with data servers, other UEs 101, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 101 may communicate.

Figure 9:
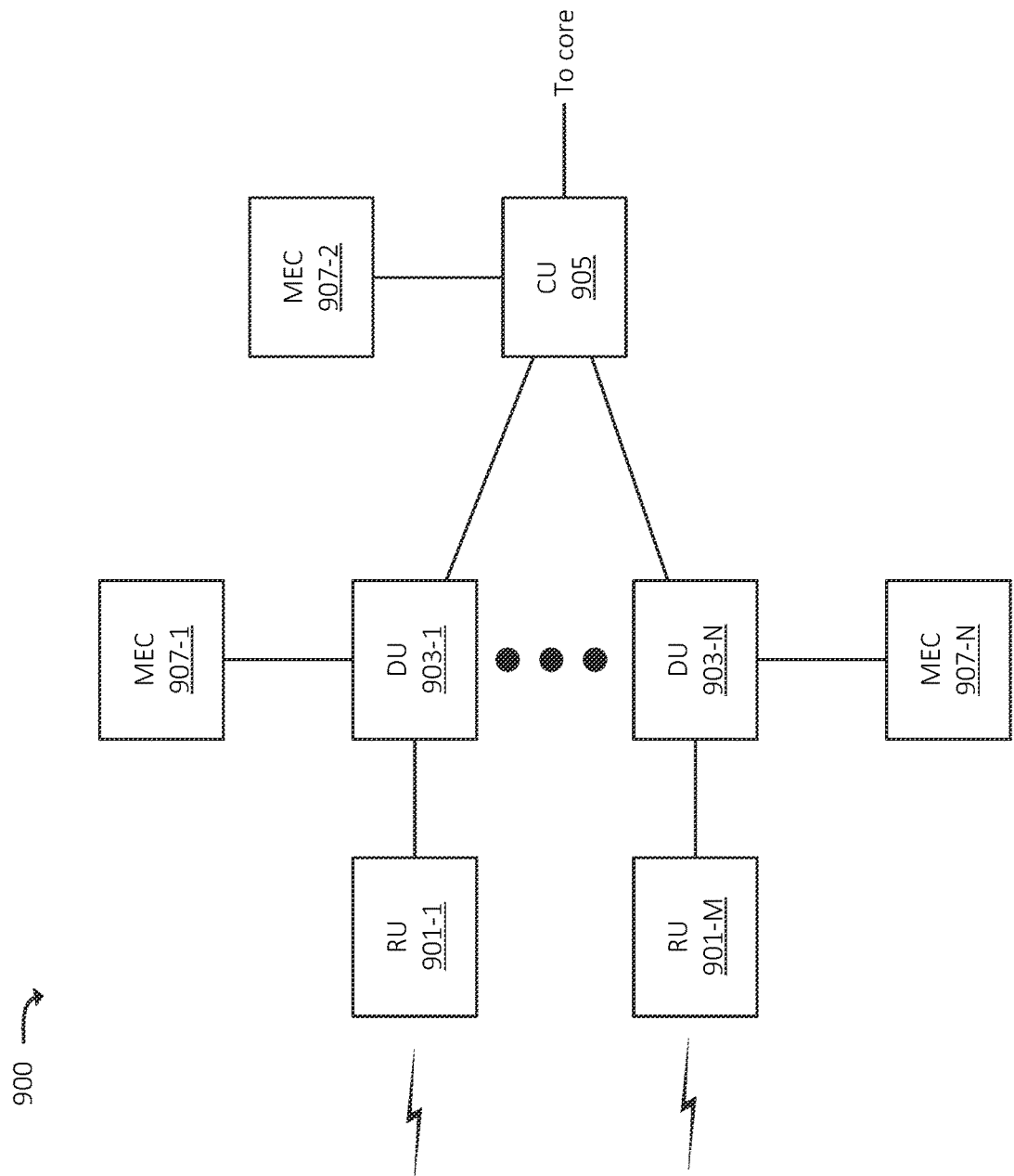
FIG. 9 illustrates an example arrangement of a radio access network ("RAN"), in accordance with some embodiments.

FIG. 9 illustrates an example RAN environment 900, which may be included in and/or implemented by one or more RANs (e.g., RAN 810, RAN 812, or some other RAN). In some embodiments, a particular RAN may include one RAN environment 900. In some embodiments, a particular RAN may include multiple RAN environments 900. In some embodiments, RAN environment 900 may correspond to a particular gNB 811 of a 5G RAN (e.g., RAN 810). In some embodiments, RAN environment 900 may correspond to multiple gNBs 811. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 303 and/or UPF/PGW-U 835). In the uplink direction (e.g., for traffic from UEs 101 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 101, and may determine which DU(s) 903 should receive the downlink traffic. DU 903 may include one or more devices that transmit traffic between a core network (e.g., via CU 905) and UE 101 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 101.

RU 901 may include hardware circuitry (e.g., one or more RF transceivers, antennas, radios, and/or other suitable hardware) to communicate wirelessly (e.g., via an RF interface) with one or more UEs 101, one or more other DUs 903 (e.g., via RUs 901 associated with DUs 903), and/or any other suitable type of device. In the uplink direction, RU 901 may receive traffic from UE 101 and/or another DU 903 via the RF interface and may provide the traffic to DU 903. In the downlink direction, RU 901 may receive traffic from DU 903, and may provide the traffic to UE 101 and/or another DU 903.

One or more elements of RAN environment 900 may, in some embodiments, be communicatively coupled to one or more Multi-Access/Mobile Edge Computing ("MEC")

devices, referred to sometimes herein simply as "MECs" 907. For example, DU 903-1 may be communicatively coupled to MEC 907-1, DU 903-N may be communicatively coupled to MEC 907-N, CU 905 may be communicatively coupled to MEC 907-2, and so on. MECs 907 may include hardware resources (e.g., configurable or provisionable hardware resources) that may be configured to provide services and/or otherwise process traffic to and/or from UE 101, via a respective RU 901.

For example, DU 903-1 may route some traffic, from UE 101, to MEC 907-1 instead of to a core network via CU 905. MEC 907-1 may process the traffic, perform one or more computations based on the received traffic, and may provide traffic to UE 101 via RU 901-1. In some embodiments, MEC 907 may include, and/or may implement, some or all of the functionality described above with respect to URMS 105, AF 830, UPF 835, and/or one or more other devices, systems, VNFs, CNFs, etc. In this manner, ultra-low latency services may be provided to UE 101, as traffic does not need to traverse DU 903, CU 905, links between DU 903 and CU 905, and an intervening backhaul network between RAN environment 900 and the core network.

Figure 10:
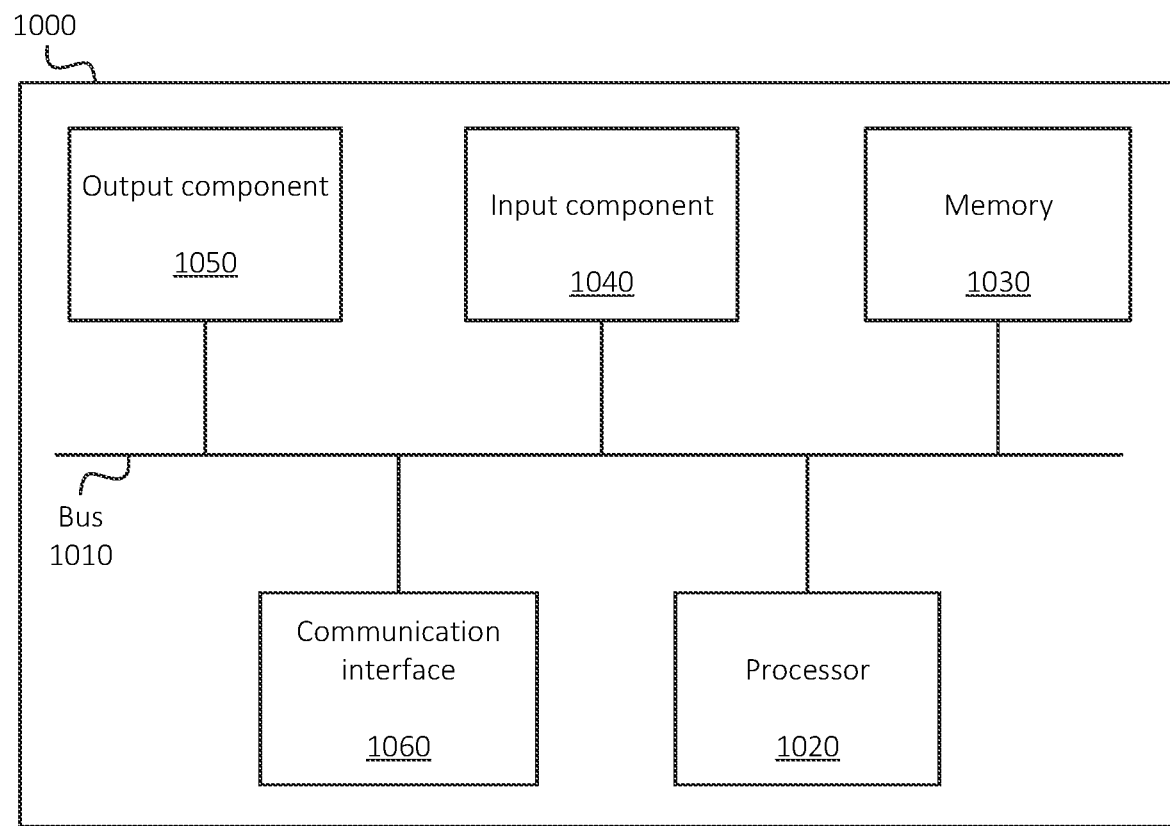
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, an industrial sensor, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A first User Equipment ("UE"), comprising:
one or more processors configured to:
communicate with a second UE via a communication link to determine operational status of the second UE, wherein the second UE is connected to a network via one or more communication sessions;
determine, based on the communication link, that the second UE is non-operational;
output, based on determining that the second UE is non-operational, a request to communicate with the network via the one or more communication sessions associated with the second UE, wherein the network modifies the one or more communication sessions to be associated with the first UE based on the request; and
communicate with the network via the one or more modified communication sessions.

2. The first UE of claim 1, wherein the one or more processors are further configured to:
register as a backup UE for the second UE, wherein the network verifies that the first UE is authorized to request modification of the one or more communication sessions associated with the UE based on the registering.

3. The first UE of claim 2, wherein registering as a backup UE includes providing a first set of attributes associated with the first UE, wherein one or more devices verify that the first UE is authorized to register as a backup UE for the second UE based on comparing the first set of attributes, associated with the first UE, to a second set of attributes associated with the second UE.

4. The first UE of claim 1, wherein the first UE includes a first set of sensors of a particular type, and wherein the second UE includes a second set of sensors of the same particular type, wherein communicating with the network via the one or more communication sessions includes outputting sensor data, from at least a portion of the first set of sensors, via the network.

5. The first UE of claim 1, wherein the one or more communication sessions indicate the second UE as an endpoint prior to the modification of the one or more communication sessions, and wherein the modified one or more communication sessions indicate the first UE as an endpoint.

6. The first UE of claim 1, wherein the one or more processors are further configured to:
receive, via the communication link, context information associated with the one or more communication sessions, wherein outputting the request to communicate via the network includes providing at least a portion of the context information to the network.

7. The first UE of claim 1, wherein the one or more processors are further configured to:
maintain an idle mode connection with a radio access network ("RAN") of the network prior to determining that the second UE is non-operational,
wherein outputting the request to communicate with the network includes outputting a request to switch the idle mode connection, with the RAN, to an active mode connection.

8. A non-transitory computer-readable medium, storing a plurality of processor-executable instructions to:
communicate, by a first User Equipment ("UE"), with a second UE via a communication link to determine operational status of the second UE, wherein the second UE is connected to a network via one or more communication sessions;
determine, based on the communication link, that the second UE is non-operational;
output, based on determining that the second UE is non-operational, a request to communicate with the network via the one or more communication sessions associated with the second UE, wherein the network modifies the one or more communication sessions to be associated with the first UE based on the request; and
communicate with the network via the one or more modified communication sessions.

9. The non-transitory computer-readable medium of claim 8, wherein the plurality of processor-executable instructions further include processor-executable instructions to:
register as a backup UE for the second UE, wherein the network verifies that the first UE is authorized to request modification of the one or more communication sessions associated with the UE based on the registering.

10. The non-transitory computer-readable medium of claim 9, wherein registering as a backup UE includes providing a first set of attributes associated with the first UE, wherein one or more devices verify that the first UE is authorized to register as a backup UE for the second UE based on comparing the first set of attributes, associated with the first UE, to a second set of attributes associated with the second UE.

11. The non-transitory computer-readable medium of claim 8, wherein the first UE includes a first set of sensors of a particular type, and wherein the second UE includes a second set of sensors of the same particular type, wherein communicating with the network via the one or more communication sessions includes outputting sensor data, from at least a portion of the first set of sensors, via the network.

12. The non-transitory computer-readable medium of claim 8, wherein the one or more communication sessions indicate the second UE as an endpoint prior to the modification of the one or more communication sessions, and wherein the modified one or more communication sessions indicate the first UE as an endpoint.

13. The non-transitory computer-readable medium of claim 8, wherein the plurality of processor-executable instructions further include processor-executable instructions to:
receive, via the communication link, context information associated with the one or more communication sessions, wherein outputting the request to communicate via the network includes providing at least a portion of the context information to the network.

14. The non-transitory computer-readable medium of claim 8, wherein the plurality of processor-executable instructions further include processor-executable instructions to:
maintain an idle mode connection with a radio access network ("RAN") of the network prior to determining that the second UE is non-operational,
wherein outputting the request to communicate with the network includes outputting a request to switch the idle mode connection, with the RAN, to an active mode connection.

15. A method, comprising:
communicating, by a first User Equipment ("UE"), with a second UE via a communication link to determine operational status of the second UE, wherein the second UE is connected to a network via one or more communication sessions;
determining, by the first UE and based on the communication link, that the second UE is non-operational;
outputting, by the first UE and based on determining that the second UE is non-operational, a request to communicate with the network via the one or more communication sessions associated with the second UE, wherein the network modifies the one or more communication sessions to be associated with the first UE based on the request; and
communicating, by the first UE, with the network via the one or more modified communication sessions.

16. The method of claim 15, further comprising:
registering as a backup UE for the second UE, wherein the network verifies that the first UE is authorized to request modification of the one or more communication sessions associated with the UE based on the registering.

17. The method of claim 15, wherein the first UE includes a first set of sensors of a particular type, and wherein the second UE includes a second set of sensors of the same particular type, wherein communicating with the network via the one or more communication sessions includes outputting sensor data, from at least a portion of the first set of sensors, via the network.

18. The method of claim 15, wherein the one or more communication sessions indicate the second UE as an endpoint prior to the modification of the one or more communication sessions, and wherein the modified one or more communication sessions indicate the first UE as an endpoint.

19. The method of claim 15, further comprising:
receiving, via the communication link, context information associated with the one or more communication sessions, wherein outputting the request to communicate via the network includes providing at least a portion of the context information to the network.

20. The method of claim 15, further comprising:
maintaining an idle mode connection with a radio access network ("RAN") of the network prior to determining that the second UE is non-operational,
wherein outputting the request to communicate with the network includes outputting a request to switch the idle mode connection, with the RAN, to an active mode connection.

* * * * *